United States Patent [19]

Stemmle

[11] Patent Number: 5,049,999
[45] Date of Patent: Sep. 17, 1991

[54] COMPACT MULTIMODE INPUT AND OUTPUT SCANNER

[75] Inventor: Denis J. Stemmle, Webster, N.Y.

[73] Assignee: Xerox Corporation, Stamford, Conn.

[21] Appl. No.: 547,887

[22] Filed: Jul. 2, 1990

[51] Int. Cl.⁵ .................... H04N 1/028; H04N 1/034; H04N 1/10

[52] U.S. Cl. .................................. 358/296; 358/472; 358/497; 358/483; 346/140 R

[58] Field of Search ............... 358/296, 300, 302, 401, 358/472, 473, 476, 494, 496, 497, 498, 474, 482, 483; 346/143, 140 R

[56] References Cited

U.S. PATENT DOCUMENTS

| | | | |
|---|---|---|---|
| 4,476,496 | 10/1984 | Thaler | 358/296 |
| 4,609,946 | 9/1986 | Thaler | 358/296 |
| 4,635,130 | 1/1987 | Oi | 358/296 |
| 4,652,937 | 3/1987 | Shimura | 358/473 |
| 4,905,090 | 2/1990 | Miyake | 358/296 |
| 4,920,421 | 4/1990 | Stemmle | 358/296 |

Primary Examiner—Benjamin R. Fuller
Assistant Examiner—Scott A. Rogers

[57] ABSTRACT

A compact combined input scanner and output scanner having a frame assembly with a scanning carriage movably mounted for movement in a scanning path in a first direction across the length of said frame assembly. The scanning carriage has co-mounted a reading head secured thereto for scanning a document to produce a digital image of at least a portion of the document and a printing head secured thereto for relative movement with respect to a copy sheet and electrically connected to the reading head for printing a digital image on a copy sheet. The frame assembly includes copy sheet and document transport paths with an indexer to index a document through the document path in a direction transverse to the first direction and to index a copy sheet through the copy sheet path in the opposite transverse direction of indexing of said document.

24 Claims, 5 Drawing Sheets

COMPACT MULTIMODE INPUT AND OUTPUT SCANNER

CROSS REFERENCE TO RELATED APPLICATIONS

Attention is directed to my copending application Ser. No. 07/257,366 entitled Simultaneous Read/Write Copier filed Oct. 13, 1988. Attention is also directed to copending application Ser. No. 07/547,264 (D/89395) entitled Compact Read/Write Scanner; Ser. No. 07/547,275 (D/89396) entitled Platen Accessory For Portable Copier and Ser. No. 07/547,272 (D/89399) entitled Scanner with Document and Copy Sheet Registration Means; all filed concurrently herewith and commonly assigned.

BACKGROUND OF THE INVENTION

The present invention relates to a very low cost portable compact scanner. More particularly it is directed to a compact device employing a single scanning carriage incorporating a reading head and a printing head to permit essentially simultaneous reading and writing of an original document and a copy.

Historically, copies of original documents have been produced by a xerographic process wherein the original document to be copied is placed on a transparent platen, either by hand or automatically through the use of a document handler, and the original document illuminated by a relatively high intensity light. Image rays reflected from the illuminated document are focused by a suitable optical system onto a previously charged photoconductor, the image light rays functioning to discharge the photoconductor in accordance with the image content of the original to produce an electrostatic latent image of the original on the photoconductor. The electrostatic latent image so produced is thereafter developed by a suitable developer material commonly referred to as toner, and the developed image transferred to a sheet of copy paper brought forward by a suitable feeder. The transferred image is thereafter fixed to the copy paper by fusing to provide a permanent copy while the photoconductor is cleaned of residual developer preparatory to recharging. More recently, interest has arisen in electronic imaging where, in contrast to the aforedescribed xerographic system, the image of the document original is converted to electrical signals or pixels and these signals, which may be processed, transmitted over long distances, and/or stored, are used to produce one or more copies. In such an electronic imaging system, rather than focusing the light image onto a photoreceptor for purposes of discharging a charged surface prior to xerographic development, the optical system focuses the image rays reflected from the document original onto the image reading array which serves to convert the image rays to electrical signals. These signals are used to create an image by some means such as operating a laser beam to discharge a xerographic photoreceptor, or by operating some direct marking system such as an ink jet, direct thermal or thermal transfer printing system.

It is generally advantageous if the normally separate document reading and copy printing operations could be combined. If some of these reading/writing functions could be combined, system operation and synchronization could be simplified and system cost reduced through the use of fewer parts.

There are systems in the prior art that address the above identified concerns. For example:

U.S. Pat. No. 4,496,984 to Stoffel and U.S. Pat. No. 4,583,126, a division of the above-identified reference, disclose an input/output scanner for simultaneously reading a document and writing a copy. The document and copy sheet are fed in back to back relation to the read/write station. A monolithic full width reading array reads each line in two steps, to improve resolution. The writing array consists of rows of ink jet nozzles, of which the number and disposition is in direct correspondence to the sensors of the read bar.

U.S. Pat. No. 4,424,524 to Daniele discloses a full width read/write LED array for scanning a document in the read mode or exposing the photoreceptor in the write mode. A Selfoc optical fiber lens array is used for focusing the full width LED array on the document or photoreceptor.

A difficulty with these prior art systems is the complexity and cost of separate components such as the complex optics, photoreceptor and developer in a typical xerographic process such as the Daniele system. In other systems such as the Stoffel system, it is necessary for an operator to manually combine a document and copy sheet into a single unit for manual insertion to the machine feed rolls. Such a system also has a significant cost penalty associated with components such as the monolithic full width reading array. It is an object of the present invention, therefore, to provide a new and improved read/write scanner/printer system in which a read head and print head are both substantially smaller and less expensive than a full width array component, and co-mounted on the same single scanning carriage to substantially simultaneously read a stationary document and print a copy on a copy sheet. It is another object of the present invention to provide a document that is read and a copy that is printed in a series of bands across the document and copy, that is, after each band of information is read and printed, the document and copy sheet are indexed relative to the read and write components so that the next band of information can be read and printed.

Most of the reproduction devices and in particular copiers in commercial utilization are intended for permanent or semi-permanent location in an office environment. Indeed some are so large complex and expensive that only sizable office environments can support the copier. There is, however, a great need for a portable copier. There is a particular need for very low cost very compact copiers which enable convenient reproduction of documents at sites remote from an office environment. While many efforts have been made there is a continuing need for a smaller, more compact, lower cost copying capability.

PRIOR ART

U.S. Pat. No. 4,319,283 to Ozawa et al. discloses a portable copying machine. A light receiving element and a thermal recording head are both mounted upon a single moving element. The thermal recording head is positioned stationary while the light receiving element is movable in a longitudinal scanning direction. A heat sensitive recording sheet is moved in correspondence with lateral movement of the light receiving element. The machine achieves copying without such components as an image forming optical system, a photosensitive element, a developing mechanism, and a fixing mechanism.

U.S. Pat. No. 4,574,317 fo Scheible discloses a hand scannable portable copier for use in copying documents or excerpts of documents comprising a solid state optical sensor array in a thermal print head array supported within a pocket sized housing. Copies are made using a thermal copy sheet by passing scanning light through the copy sheet, reflecting light back from the original image and copying underneath. Portable battery 24 supplies power to the copier.

U.S. Pat. No. 4,823,195 to Ito discloses an apparatus in which combined reader and printer heads are scanned together across a document and a copy sheet to process the image lines block by block. As each scan is completed the document and copy sheet are stepped ahead in synchronization with one another by a distance equal to the width of the block of lines scanned.

In addition there are several devices including hand held copiers that use direct thermal printing technology for direct marking onto imaging widths of from 40 millimeters to 100 millimeters wide.

In my above crossed referenced copending application Ser. No. 07/257,366 a combined input and output scanner is described wherein a scanning carriage has secured thereto a reading head and a printing head which carriage system scans across a document scanning a band of information across the document on a platen. The carriage system has a separate indexing mechanism to index the scanning carriage to a second position to scan another band of information across the document.

SUMMARY OF THE INVENTION

The present invention is directed to a small combined input output scanning system of ultra compactness, very low cost, a high degree of portability and in fact may even be disposable. When compared with the combined input and output scanning system in my above referenced copending application, it will be observed that several features have been eliminated from the combined input output scanning system while retaining the essential capability of making a copy of a document. While the principle capability of the combined input output scanner is in the production of copies from original documents it has the additional capability of operating as a printer, as a scanner or as a facsimile device providing a truly multimode capability.

In accordance with a principle aspect of the present invention, a compact copier having a combined input output scanning system is provided which includes a frame assembly containing a carriage movably mounted in the frame assembly for relative forward and backward bidirectional scanning movement in a scanning path in a first direction along the length of the frame assembly the scanning carriage including a reading head secured thereto for scanning a document to produce a digital image of the document and a printing head secured thereto for relative movement with respect to a copy sheet and electrically connected to the reading head for printing the digital image on the copy sheet, the reading and printing occurring essentially simultaneously. The frame assembly includes copy sheet and document transport paths which include indexing means to index a document through the document path in a direction transverse to the first direction and to index a copy sheet through the copy sheet path in the opposite transverse direction of indexing a document in order to create the digital image on the copy sheet as a right reading image.

In a further aspect of the present invention the scanning carriage is movably mounted between the plane of the document transport path and the plane of the copy sheet transport path.

In a further aspect of the present invention the document transport path is above the copy sheet transport path and the reading head and printing head are co-mounted on the scanning carriage simultaneously reading a document face side down in the document transport path and printing a digital image face side up on a copy sheet in the copy sheet transport path.

In a further aspect of the present invention the indexing means simultaneously indexes a document in the document transport path and a copy sheet in the copy sheet transport path.

In a further aspect of the present invention the reading head scans a band of information across the document and the printing head essentially simultaneously prints the same band of information across a copy sheet and upon completion of the scanning movement the indexing means indexes the document and copy sheet through their respective paths a distance equal to the width the band of information.

In a further aspect of the present invention the indexing means is at one end of the frame assembly adjacent an end of the scanning path and includes a first pair of synchronously driven rotatable drive rolls with each drive roll forming a feeding nip for a document with a document feed idler roll and a feeding nip for a copy sheet with a copy sheet feed idler roll.

In a further aspect of the present invention the drive rolls have a circumference equal to the width of the band of information scanned.

In a further aspect of the present invention the document feed nip is on top of the drive roll and the copy sheet feed nip is at the bottom of the drive roll.

In a further aspect of the present invention the document feed idler rolls are mounted on a top cover for the frame assembly which is pivotally mounted through the frame assembly at the downstream end of the document transport path and has a document registration edge which extends into the downstream end of the document transport path when the top cover is pivoted to the open position, and when in the open position the document feed idler rolls are disengaged from the drive roll and the document may be placed in the document transport path and registered against the registration edge.

In a further aspect of the present invention a copy sheet registration edge is provided which is movable into the downstream end of the copy sheet transport path in response to pivoting the cover to the open position to register the lead edge of said copy sheet.

In a further aspect of the present invention means responsive to moving the cover from the open position to the closed position to reengage the document and copy sheet idler rolls with the drive rolls, withdraw the copy sheet registration edge and initiate the copying sequence are provided.

In a further aspect of the present invention a method of making a copy of a document onto a copy sheet without information storage with a scanning unit including a co-mounted reading and printing head includes the step of scanning the co-mounted unit in a path across the document and copy sheet in a first direction, indexing the document and copy sheet relative to the co-mounted unit a predetermined distance in a direction transverse to the first direction and repeating the scanning motion relative to the document and copy sheet repeating the indexing motion relative to the co-mounted unit, the reading head reading a portion of the document during the movements across the document and the printing head printing a portion of a copy during movement across the document.

BRIEF DESCRIPTION OF THE DRAWINGS

For a better understanding of the present invention reference is had to the accompanied drawings wherein the reference numerals have been applied to the same parts in several figures.

DESCRIPTION OF PREFERRED EMBODIMENT

Figure 6A:
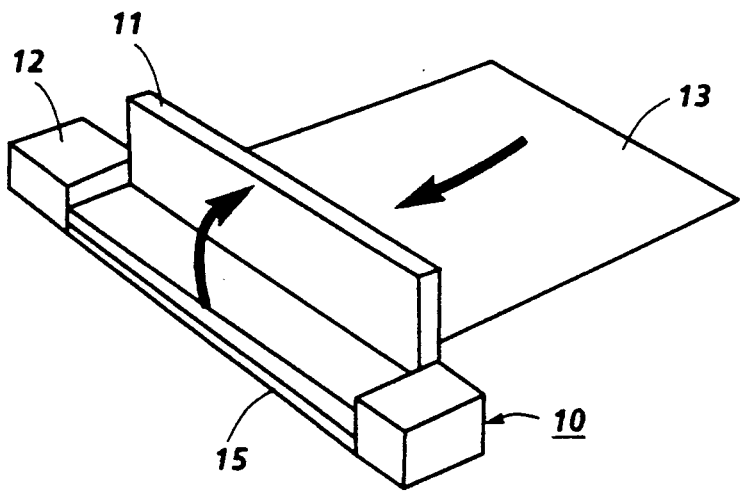
FIGS. 6A, 6B, and 6C are three isometric views illustrating the general operation of the compact copier.
Figure 6B:
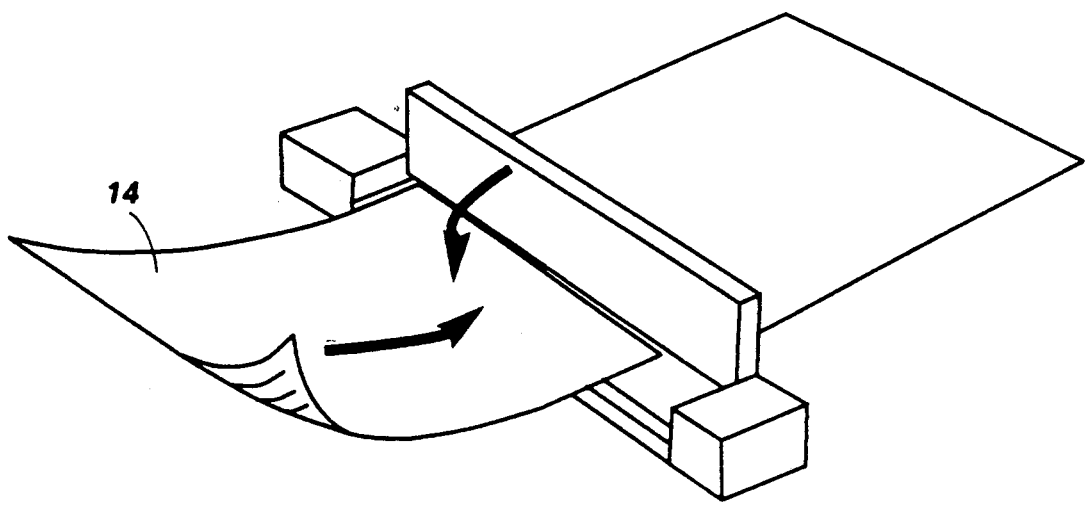
Figure 6C:
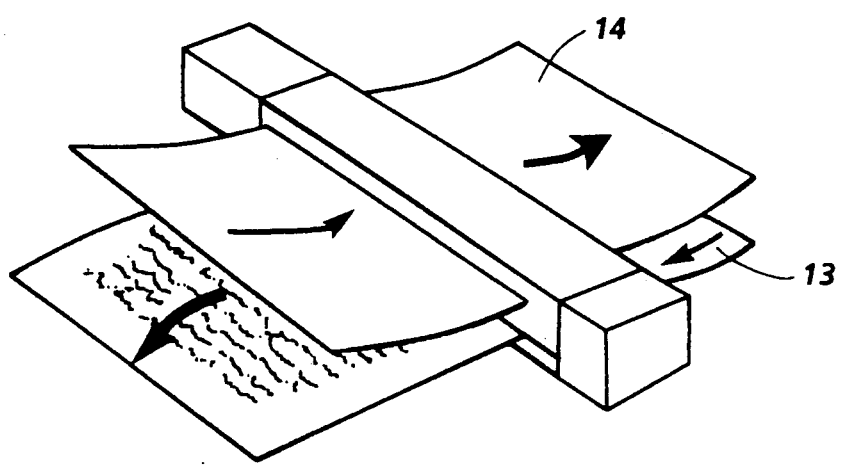

Referring now to FIGS. 6A, 6B and 6C a general overview of the compact portable copier according to the present invention is provided. The copier is generally illustrated as comprising a frame assembly 15 having a maintenance station 12 at one end and a top cover 11 pivotally mounted to the frame assembly. To make a copy of document 14 the top cover is rotated to the open position as shown in FIG. 6A, copy sheet 13 is inserted at the entrance of the copy sheet transport path and the document 14 is inserted against a registration stop member in the top cover after which the top cover is closed and the copying sequence begins by the scanning carriage scanning a band of information across the document. During the scanning operation the image on the document is digitized by an input digitizing system and in the preferred embodiment a digital image is essentially simultaneously printed by a printing system on the copy sheet. Subsequently, the document is indexed to the right and the copy sheet is indexed to the left to enable the scanning carriage to scan a second band of information in the reverse scanning direction across the document. The distance of the indexing of both the document and copy sheet is the width of the band of information across the document.

Figure 1:
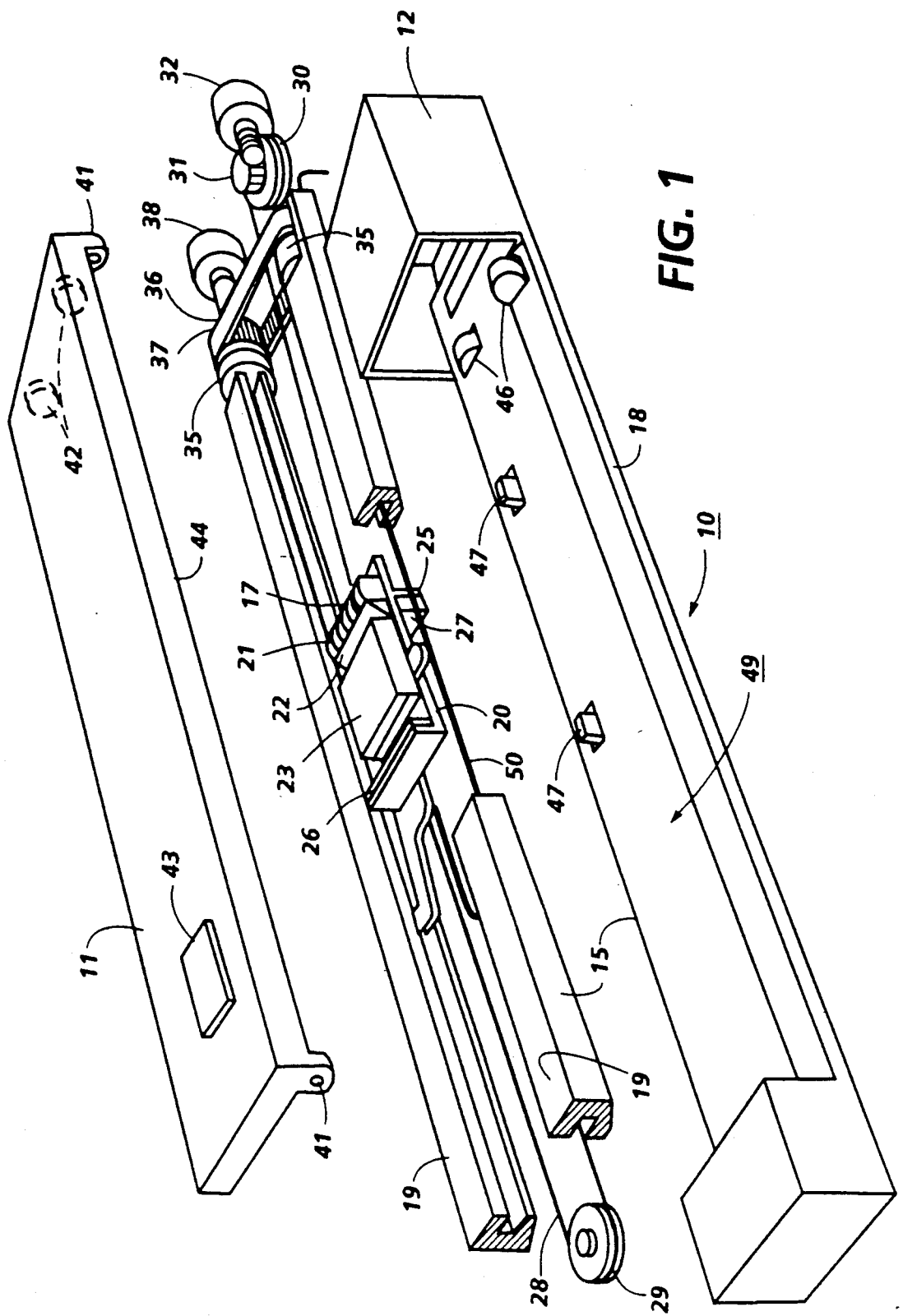
FIG. 1 is an exploded isometric view of the compact copier according to the present invention.
Figure 2:
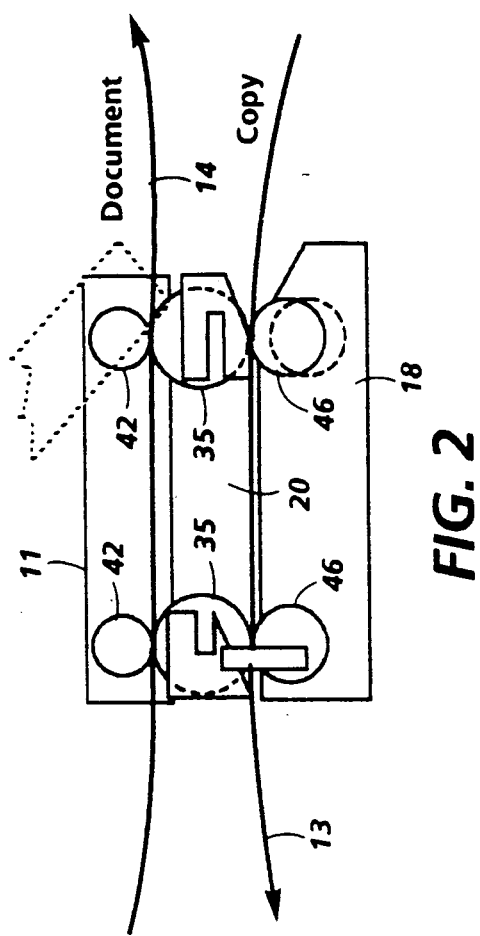
FIG. 2 is a schematic cross sectional view of the compact copier according to the present invention.

Referring to FIGS. 1 and 2 of the drawings there is shown a combined input scanner and output scanner designated generally by reference numerial 10. The scanner 10 includes a frame assembly 15 composed of a base unit 18, rails 19 within which scanning carriage 20 is transported during its scanning path. When not in scanning operation the scanning carriage 20 is parked in the maintenance station 12 where it is protected from contamination and maintained in a relatively constant environment. For input scanning an imaging assembly includes an illuminator 21 which may be an array of light emitting diodes (LED) or any other suitable device, a mirror 22, a lens 23 which may be a Selfoc lens and an input digitizing chip 26 which may be a charged coupled device (CCD) array or any other suitable device for receiving optical signals and converting them into electronic pixel information in a data register. This assembly scans or reads a document 14 the image area being converted to electric image signals or pixels. The image signals generated by the reading head are input to a print bar 25 which may be any suitable direct marking device such as a direct thermal or thermal transfer head or preferably a thermal ink jet array 25 to write copies of the document originals in accordance with the image signals onto a suitable substrate or copy sheet 13. It will be understood that the number of scanning elements or sensors that comprise the image read bar 17 determine the initial scanning resolution while the number of ink jet nozzles 27 that comprise the print bar 25 determine the resolution of the image copy. In a preferred embodiment the number of input scanning elements equals the number of output printing elements. Both the scanning head and the print head are secured for movement on scanning carriage 20 which is mounted for either undirectional or forward and backward bi-directional scanning movement in a scanning path along the length of the frame assembly by means of scan motor 32 through gear 31 pulleys 29 and 30 and cable 28 to move the scanning carriage in the rails 19.

Figure 7:
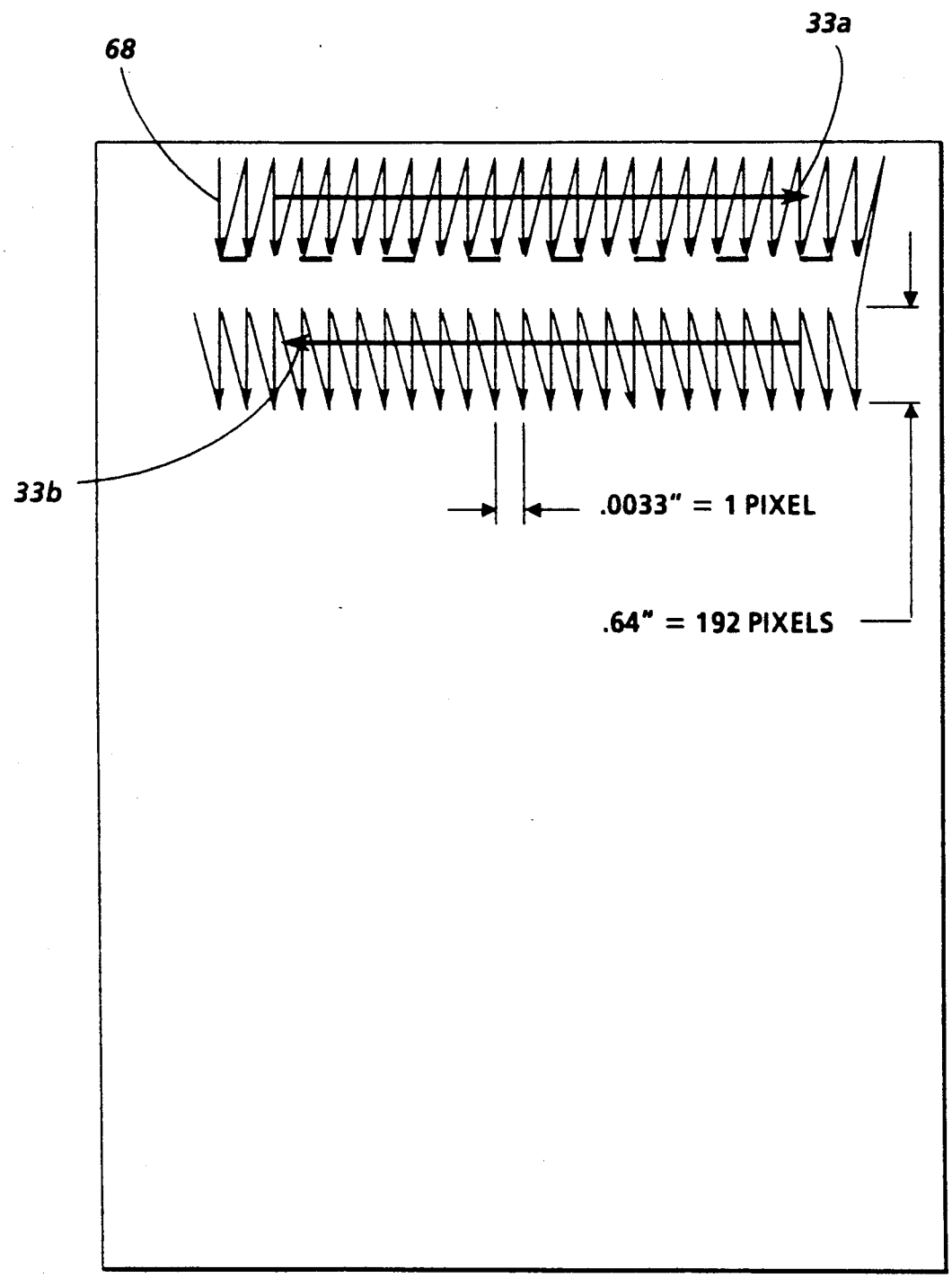
FIG. 7 is an illustration of the scanning operation.

The movement of the scan carriage 20 supporting image read assembly 21, 22, 23, 26 and print bar 25 is further illustrated with respect to FIG. 7. Arrows 33a and 33b illustrate the forward and reverse scan of the carriage 20 across a document and copy sheet, also shown in FIG. 2. The arrows 68 illustrate that a number of pixels, perpendicular to the direction of movement of scan carriage 22, are both read by the read assembly and printed by the print bar as the carriage scans the document and copy sheet. In a typical embodiment, 192 pixels at 300 per inch are read and printed perpendicular to the movement of carriage as it scans. In this example arrow 68 represents a band of information 0.0033 inch long and 0.64 inch wide which is read and printed. The movement of the carriage can be continuous or in discrete steps, but in a preferred embodiment, the 192 pixels are read and printed in increments that are one pixel apart as shown. In one embodiment, each time the scan carriage moves a distance of one pixel width across the sheet, the electronic image of 192 pixels down the sheet are moved into a shift register and then amplified and shifted in reverse order into the print bar to fire the 192 ink jets and thereby create a print of the 192 pixels previously read. This sequence is repeated each time the scan carriage has moved a distance of one pixel width. It should be noted that the scanning could also be done with 192 parallel channels, each channel reading and writing a single line of pixels as the carriage sweeps across the page. While it is preferred that the read/write operation be substantially simultaneous it should also be noted that a digital buffer or register could be incorporated to initially store the scanned or read signals for later printing after a predetermined or arbitrary time period. It should also be understood that the combined scanner illustrated has multimode capability and could be operated independently as a printer modulated by any suitable device providing digital information, operated independently as a scanner to convert source documents to a digital representation, operated as a facsimile device using the reading and printing elements when combined with a suitable modem or operated as a copier by combining the scanning and printing operations.

Figure 3:
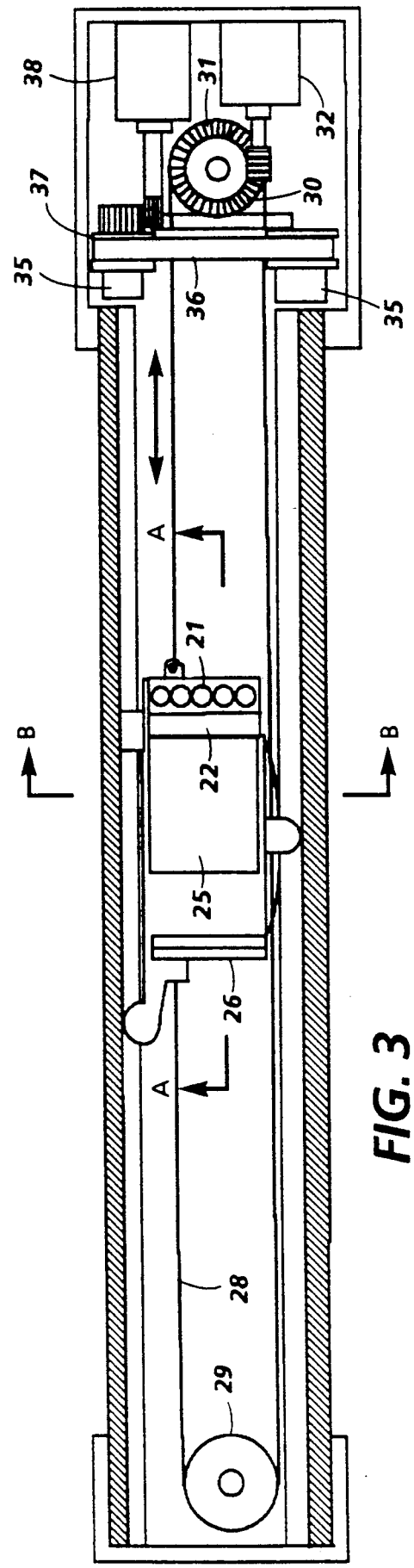
FIG. 3 is a plan view illustrating the scanning carriage system.

Following a scanning run in either direction across the length of the frame assembly the document and copy sheet are each indexed through the scanner in opposite directions a distance equal to the width of the band of information on the document scanned by the reading head which is the same as the width of the band of information printed on the copy sheet by the printing head. This width can be any width from a minimum of a single pixel line to a maximum of the width of the entire document. In practical terms, however, in order to keep the cost of the read and write components low the width of the band is of the order of a fraction of an inch to several inches wide. The mechanism for achieving this is illustrated with further reference to FIGS. 1, 2 and 3, wherein an indexing means is provided at one end of the frame assembly comprising a pair of synchronously driven rotatable drive rolls 35 forming a feeding nip for a document with document feed idler rolls 42 contained within the top cover 11 of the scanner. The term synchronously driven is intended to define only that the drive rolls 35 are synchronized to each other. The drive rolls 35 also form a feeding nip for a copy sheet with the copy sheet idler rolls 46 in the copy sheet transport path. The drive rolls 35 are driven by index motor 38 through pulley 37 and belt 36. The scan motor 32 and the index motor 38 are controlled by logic 33 as illustrated in FIG. 4.

Figure 5:
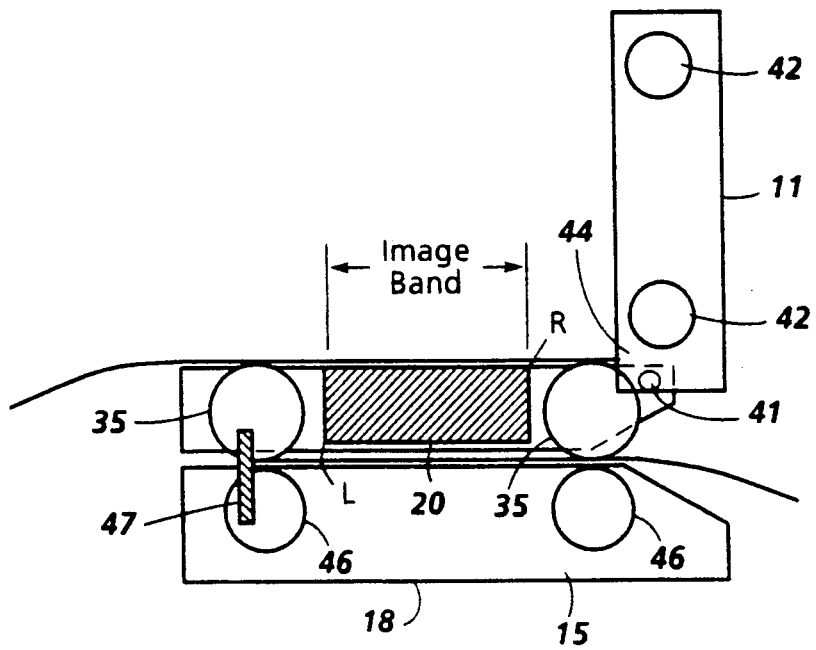
FIG. 5 is a sectional view taken along the line BB in FIG. 3 illustrating the registration mechanism for the document as well as the copy sheet according to the present invention.

With additional reference to FIG. 5, the top cover 11 is pivotally mounted to the frame assembly 15, in particular the base unit 18, and pivots about points 41. When the top cover is pivoted to the open position the document feed idler rolls 42 are disengaged from the drive rolls and the registration edge 44 is inserted into the plane of the document transport path enabling the placement of a document to be copied in the scanner with its lead edge registered and inhibiting transport of the document through the document transport path. In a similar manner the first incoming copy sheet idler roll 46 in the base unit is retracted from engagement from the drive roll 35 by linkage (not shown) when the top cover is raised to the open position. Similarly, registration gates 47 are inserted into the copy sheet transport path to enable manual registration of the copy sheet.

In a preferred embodiment the circumference of the drive rolls is equal to the width of the band of information across the document scanned by the scanning carriage to eliminate run out and shaft straightness tolerance defects which otherwise might cause some misregistration between scan widths.

Figure 4:
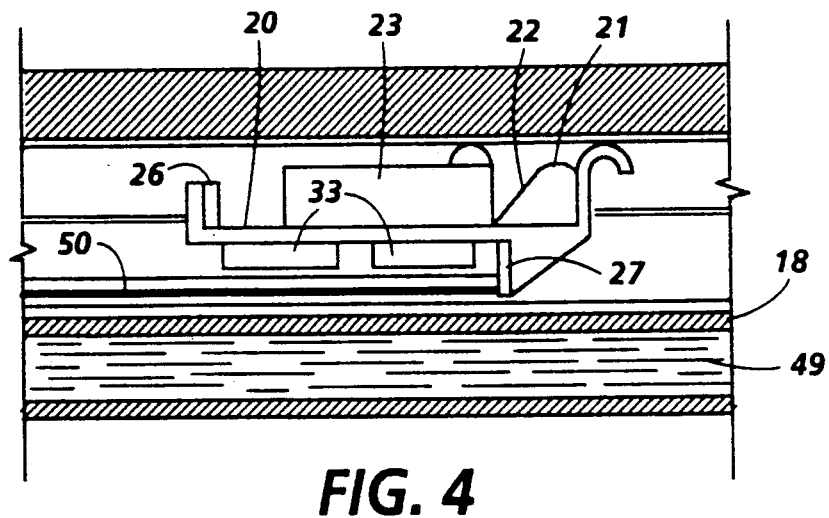
FIG. 4 is a sectional view along the line AA of FIG. 3 illustrating the elements of the scanning carriage in the present invention.

As further illustrated in FIG. 4 the base unit 18 has ink supply 49 connected to the ink jet print head 27 by means of a flexible umbilical ink supply tube 50. While the scanner of the present invention may have power supplied by conventional connection to household electrical circuit FIG. 1 illustrates a preferred embodiment wherein a rechargeable battery 43 is contained within the top cover.

In operation when the top cover is opened the idler rolls in the document path which are mounted in the top cover are moved out of position enabling placement of the document against front registration edge which is part of the top cover assembly. Opening the top cover also causes the first incoming copy paper idler roller to disengage from its drive roller and a set of registration fingers in the copy paper path to move into the copy paper path. A copy sheet may be inserted from the right until its lead edge contacts the registration fingers and a document may be inserted from the left on the top of the scanner face down. Following insertion of the copy sheet and the document the top cover is closed thereby reengaging both the copy paper and document idler rolls with the drive roll. In addition, the copy paper registration fingers are withdrawn, two sensors (not illustrated) detect that both the document and the copy paper have been loaded accordingly and the logic initiates the copying sequence. The scan carriage containing the read and write head disengages from the maintenance station and scans across the document and copy sheet while both remain stationary. The document is positioned so that its lead edge coincides with the right side pixel of the read head, and the copy paper is positioned so that its lead edge coincides with the left side pixel of the print head. This enables the formation of a right reading image in the copy sheet. A line of information on the document read on the right extreme of the image read head fires the print head on the extreme left of the printing array during the scan of the carriage 20. This may be illustrated with reference to FIG. 5. The pixel data received by the input chip at the extreme right of the chip (R); as the carriage 20 moves in the direction into and out of the paper is transmitted and amplified to modulate the print head to fire the print head at the extreme left (L) of the print head. This scheme enables the printing of right reading copies with essentially simultaneous reading and writing without information storage. As the carriage scans across both the document and the copy paper, the 0.64 inches band of information being read off the document is immediately printed onto the copy paper. When the first scan is complete the carriage motion stops. Both the document and copy paper are then indexed in a direction transverse to the scanning direction the width of the band of information previously scanned. This indexing is accomplished by driving the single pair of drive rolls which engage the document at the 12:00 position with the document feed idler rolls forming a feeding nip therebetween, and the copy paper at the 6:00 position with the copy sheet feed idler roll forming a feeding nip therebetween. The clockwise motion of the drive rolls of one revolution causes a document to be indexed 0.64 inches to the right and the copy paper to be indexed 0.64 inches to the left. In this way the second band of information from the document is moved into a position over a scan carriage and a second portion of the copy paper is moved to a position under the print head. The scan carriage scans across the document and copy paper in the reverse direction from the first scan again reading the document and immediately printing the copy. Alternatively, the scan carriage may return to the maintenance station in and scan again in the same direction. This sequence is repeated until the entire document is read and the entire copy is printed after which time the print head returns to the maintenance station and is parked. After the last scan across the document and copy paper is completed, the index motor is activated to eject the trail edge of the document to the right and the copy to the left after which the scanner returns to the dormant state until the top cover is again opened and closed to reinitiate the next copy sequence.

Thus according to the present invention a very low cost compact multimode portable scanner has been provided. This scanner may even be so economical that it can be disposed of by the user at the end of its normal life or discarded in the event of need for repairs. Major cost is eliminated by eliminating the platen, the platen cover, paper insert hold down and eject mechanisms, by using a single pair of drive rolls which index both the document and the copy paper. The reading and printing functions can be performed virtually simultaneously thus eliminating the need for electronic memory for information storage. Furthermore, in a preferred embodiment the scanning operation may be bi-directional in both reading the document and printing on the copy sheet thereby increasing the overall throughput of the scanner.

All the patents and other references identified herein together with the cross referenced copending applications are hereby specifically and totally incorporated in their entirety into this specification.

While the invention has been described with reference to specific embodiments thereof it will be apparent to those skilled in the art that many alternatives modifications and variations may be made. For example while the invention has been illustrated with respect to having an indexing mechanism for the document and copy sheets on only one side of the scanner it will be appreciated that a similar indexing mechanism may be provided on the opposite side of the scanner. Further, as discussed above while the invention has been illustrated as a copier it is also capable of being operated independently as a printer, scanner or facsimile device. Accordingly it is intended to embrace all such alternatives and modifications as may fall in the spirit of the appended claims.

I claim:

1. A compact combined input scanner and output scanner comprising a frame assembly containing a carriage movably mounted in said frame assembly for scanning movement in a scanning path in a first direction along the length of said frame assembly, said scanning carriage including a co-mounted reading head secured thereto for scanning a document to produce a digital image of at least a portion of the document and a printing head secured thereto for relative movement with respect to a copy sheet and electrically connected to said reading head for printing said digital image on said copy sheet, said frame assembly including copy sheet and document transport paths including means to index a document through said document path in a direction transverse to said first direction and to index a copy sheet through said copy sheet path in the opposite transverse direction of indexing of said document and wherein the right side pixel of the read head coincides with the lead edge of a portion of a document to be copied and the left side pixel of the print head coincides with the lead edge of the print of said portion on a copy sheet to form a right reading image on the copy sheet.

2. The scanner of claim 1 wherein said reading and printing occur essentially simultaneously without information storage.

3. The scanner of claim 1 wherein said carriage is mounted for bidirectional scanning movement in said frame assembly.

4. The scanner of claim 1 wherein said scanning carriage is movably mounted between the plane of said document transport path and the plane of said copy sheet transport path.

5. The scanner of claim 4 wherein said document transport path is above said copy sheet transport path and said reading head and printing head are co-mounted on said scanning carriage for essentially simultaneously reading a document face side down in said document transport path and printing a digital image face side up on a copy sheet.

6. The scanner of claim 1 wherein said indexing means simultaneously indexes a document in said document transport path and a copy sheet in said copy sheet transport path.

7. The scanner of claim 1 wherein when said carriage moves in said first direction the reading head scans a band of information across the document and the printing head essentially simultaneously prints the same band of information across a copy sheet and upon completion of said scanning movement said indexing means indexes the document and copy sheet through their respective paths a distance equal to the width of said band of information before said carriage scans another band of information across the document.

8. The scanner of claim 1 wherein said printing head is a thermal ink jet array.

9. The scanner of claim 1 wherein said printing head is a direct thermal print head.

10. The scanner of claim 1 wherein said printing head is a thermal transfer print head.

11. The scanner of claim 7 wherein the indexing means includes a first pair of synchronously driven rotatable drive rolls, each drive roll forming a feeding nip for a document with a document feed idler roll and a feeding nip for a copy sheet with a copy sheet feed idler roll.

12. The scanner of claim 11 wherein the drive rolls have a circumference equal to the width of the band of information.

13. The scanner of claim 11 further including a second indexing means which includes a second pair of rotatable drive rolls synchronously driven with said first pair of drive rolls, each of said second pair of drive rolls forming a feeding nip for a document with a document feed idler roll and a feeding nip for a copy sheet with a copy sheet feed idler roll.

14. The scanner of claim 12 wherein the document feed nip is on top of the drive roll and the copy sheet feed nip is at the bottom of the drive roll.

15. The scanner of claim 1 wherein said frame assembly comprises an elongated box like structure with a substantially rectangular cross section.

16. The scanner of claim 7 wherein successive scans of said carriage across said document and copy sheet are in opposite directions.

17. The scanner of claim 14 wherein the document feed idler rolls are mounted in a top cover for the frame assembly, said cover being pivotally mounted to said frame assembly and having a document registration edge which extends into said document transport path when the top cover is pivoted to the open position whereby when said cover is pivoted to the open position the document feed idler rolls are disengaged from the drive rolls and a document may be placed in said document transport path and the lead edge registered.

18. The scanner of claim 17 including a copy sheet registration edge which is movable into said copy sheet transport path in response to pivoting said cover to the open position to register the lead edge of said copy sheet.

19. The scanner of claim 18 including means responsive to moving the cover from the open position to the closed position to reengage the document and copy sheet idler rolls with the drive roll, withdraw the copy registration edge and initiate the copy sequence.

20. In a system having a co-mounted unit of a reading and a printing head, the method of making a copy of a document onto a copy sheet without information storage comprising the steps of:

scanning the co-mounted unit in a path across the document and copy sheet in a first direction, indexing the document and copy sheet relative to the co-mounted unit a predetermined distance in a direction transverse to said first direction, and repeating the scanning motion relative to the document and copy sheet and repeating the indexing motion relative to the co-mounted unit, said reading head reading a portion of said document during said movements across said document, and said printing head printing a portion of a copy during said movement across said document and wherein the right side pixel of the read head coincides with the lead edge of a portion of a document to be copied and the left side pixel of the print head coincides with the lead edge of the print of said portion on a copy sheet to form a right reading image on the copy sheet.

21. The method of claim 20 in which said reading and printing occur essentially simultaneously.

22. The method of claim 20 in which said printing occurs a predetermined period of time after said reading.

23. The method of claim 20 in which said scanning motions across said document occur alternately in opposite directions.

24. The scanner of claim 1 including means to enable multimode operation as more than one of a copier, a printer, a scanner and a facsimilie device.

* * * * *